(12) United States Patent
Hunt

(10) Patent No.: US 12,396,394 B2
(45) Date of Patent: Aug. 26, 2025

(54) HEADER HEIGHT CONTROL FOR A HARVESTING HEAD

(71) Applicant: CNH Industrial America LLC, New Holland, PA (US)

(72) Inventor: Cory Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 837 days.

(21) Appl. No.: 17/438,310

(22) PCT Filed: Mar. 11, 2020

(86) PCT No.: PCT/US2020/022062
§ 371 (c)(1),
(2) Date: Sep. 10, 2021

(87) PCT Pub. No.: WO2020/185873
PCT Pub. Date: Sep. 17, 2020

(65) Prior Publication Data
US 2022/0183229 A1 Jun. 16, 2022

Related U.S. Application Data

(60) Provisional application No. 62/816,384, filed on Mar. 11, 2019.

(51) Int. Cl.
*A01D 41/14* (2006.01)
(52) U.S. Cl.
CPC .................................. *A01D 41/141* (2013.01)
(58) Field of Classification Search
CPC ............................ A01D 41/141; A01B 63/111
See application file for complete search history.

(56) References Cited

U.S. PATENT DOCUMENTS 3,886,718 A * 6/1975 Talbot .................. A01D 41/141
56/208
4,507,910 A * 4/1985 Thornley ............... A01D 57/00
56/DIG. 15

(Continued)

FOREIGN PATENT DOCUMENTS

| EP | 2842407 A1 | 3/2015 |
| EP | 3446558 A1 | 2/2019 |
| WO | WO-2018152266 A1 * | 8/2018 ........... A01B 63/111 |

OTHER PUBLICATIONS

International Search Report and Written Opinion for PCT application PCT/US2020/022062, mailed Jun. 22, 2020 (11 pages).

*Primary Examiner* — Tyler J Lee
*Assistant Examiner* — Matthew John Moscola
(74) *Attorney, Agent, or Firm* — Buchanan Ingersoll & Rooney PC

(57) ABSTRACT

An agricultural vehicle header having a center section and a wing section movably attached to the center section. A displacement sensor indicates a position of the wing section within its range of movement. A signal conditioning unit receives input from a displacement sensor that indicates the wing section position, an inboard height sensor, and an outboard height sensor, and applies correction factors to generate inboard and outboard control signals. When the wing section is in a median operating range the inboard correction factor is larger than the outboard correction factor. When the wing section is in a higher operating range, the outboard correction factor is larger than the inboard correction factor. An agricultural combine having the header and a method for operating a header are also provided.

20 Claims, 4 Drawing Sheets

(56) References Cited

U.S. PATENT DOCUMENTS

| | | | | |
|---|---|---|---|---|
| 5,359,836 A | * | 11/1994 | Zeuner | A01D 41/141 56/208 |
| 2018/0368317 A1 | * | 12/2018 | Schulze Selting | A01D 41/141 |

* cited by examiner

HEADER HEIGHT CONTROL FOR A HARVESTING HEAD

BACKGROUND OF THE INVENTION

Agricultural combines are machines that gather crop materials and separate the desirable crop (grain, seeds, etc.) from the discardable material (straw, tailings, etc.). To do so, the combine typically collects all of the crop materials using a system including a header and a feeder. The header gathers a wide swath of material from the ground, and moves the material towards the feeder. The feeder conveys the consolidated crop materials to the threshing and separating system, which separates the desirable crop from the remaining material.

The width of the combine header determines how much crop is collected during each pass of the combine through a field. In some cases, it is desirable to increase the width of the header to improve harvesting efficiency in terms of reducing the number of passes required to completely harvest a given area. However, wider headers can be less effective at following the ground contours than a narrow header, and this can lead to less efficient harvesting of low-growing crops or crops planted on particularly uneven terrain.

To address the problem of undulating terrain, headers have been made with articulated heads. For example, U.S. Pat. Pub. No. 2019/0000014 discloses a combine draper head having a center section and a pivotable "wing" located on each side of the center section. As another example, U.S. Pat. No. 9,992,924 discloses a combine having an articulated header that can be moved to different positions to improve harvesting and also provide a more compact profile during transport. U.S. Pat. Nos. 10,070,575 and 10,165,726 also show combines having headers with pivoting elements.

A potential problem with articulated headers is the possibility that the wings will contact the ground. To prevent such contact, the wings might be supported on caster wheels or the like that extend between each wing and the ground. In other cases, the wings might be supported by a control mechanism, such as a single-acting or double-acting hydraulic pistons, to actively control the position of the wing. For example, U.S. Pat. No. 9,668,412 shows an articulated header having wings that are each connected to the center section by a respective pivot and a respective hydraulic piston. Operation of the piston causes the wing to rotate about the pivot to change its angular position relative to the center section and its orientation relative to the ground.

A further problem with articulated headers is that in some cases they do not operate in a suitable manner with existing combine control systems that are configured to control the height or orientation of a unitary header. An example of such an existing combine system is shown in FIG. 1. Here, the combine 100 comprises a chassis 102, a header 104, and wheels 106 or the like to drive the combine 100 across the ground G. The header 104 comprises a unitary structure that does not have articulated joints (e.g., pivots or the like) along its length.

The header 104 is connected to the chassis 102 by a mount 108, such as a feeder housing that conveys crop material from the header 104 to the inner workings of the combine 100 within the chassis 102. The mount 108 is movable to reposition the header 104 relative to the chassis 102 under the control of a control system. For example, the mount 108 may be connected to the chassis 102 by a horizontal lateral pivot 110 and hydraulic actuators 112, such that operation of the actuators 112 pivots the mount 108 about the lateral pivot 110 to raise and lower the header 104. The mount 104 also may be connected for tilting movement relative to the chassis 102 by, for example, providing a longitudinal pivot 114 between the mount 108 and the header 104, and an actuator 116 to control the tilt position of the header 104.

The position of the header 104 relative to the chassis 102 is controlled by a combine control system 118, which typically is integrated into a cabin or other location within the combine chassis 102. The control system 118 receives ground height measurements from height sensors located along the header 104. For example, the header 104 may have an outboard left height sensor $120_L$, an inboard left height sensor $120_{LC}$, an outboard right height sensor $120_R$, and an inboard right height sensor $120_{RC}$. Each height sensor 120 provides a signal representative of a measurement of the height of the header 104 above the ground G at the location of the respective sensor 120. The control system 118 processes these signals to decide how to operate the actuators 112, 116 to position the header 104. For example, the control system might average the height values obtained from the inboard and outboard left height sensors $120_{LC}$ and $120_L$ to obtain a height setting for the left side of the header 104, and similarly average the height values obtained from the inboard and outboard right height sensors $120_{RC}$ and $120_R$ to obtain a height setting for the right side of the header 104, then operate the actuators 112, 116 to move the header 104 until the height sensors 120 provide signals indicating that they have obtained or sufficiently approached the desired height settings.

The correct operation of the foregoing control system is premised on the header 104 being a unitary header that does not have any articulated connections between header segments. Thus, if a segmented header having movable wings were installed in place of the unitary header 104, the output of the height sensors 120 would not be sufficient to properly control the position of the segmented header. An attempt to address the problem of controlling a segmented header using a combine control system that is intended to control a unitary header is disclosed in U.S. Pat. Pub. No. 2018/0368317. This publication describes a segmented header having angle sensing detectors that measure the angles of the wing sections relative to the center section, and height sensors to detect height above the ground at various locations along the header. When the wing sections reach a predetermined angle relative to the center section, a controller enters a "correction mode" in which an adjustment signal is sent to the header controller.

All of the foregoing references and all other references noted in this disclosure are incorporated by reference into this disclosure.

This description of the background is provided to assist with an understanding of the following explanations of exemplary embodiments, and is not an admission that any or all of this background information is necessarily prior art.

SUMMARY OF THE INVENTION

In one exemplary embodiment, there is provided a header for an agricultural vehicle. The header has a center section extending from a first end to a second end, and a wing section movably attached to the first end of the center section, the wing section being movable relative to the center section through a range of motion comprising a lower operating range including a lowest operating position, a higher operating range including a highest operating position, and a median operating range between the lower operating range and the higher operating range. A displacement sensor indicates a position of the wing section within the range of movement. An inboard height sensor is located between a centerline of the center section and a distal end of the wing section, and an outboard height sensor is located between the inboard height sensor and the distal end of the wing section. A signal conditioning unit is operatively connected to the displacement sensor, the inboard height sensor and the outboard height sensor, and configured to: receive a displacement sensor signal from the displacement sensor; receive an inboard height sensor signal from the inboard height sensor; receive an outboard height sensor signal from the outboard height sensor; determine from the displacement sensor signal whether the wing section is in the median operating range and, upon determining that the wing section is in the median operating range: apply an inboard correction factor to the inboard height sensor signal to generate an inboard control signal, and apply an outboard correction factor to the outboard height sensor signal to generate an outboard control signal, with the inboard correction factor being greater in magnitude than the outboard correction factor; and determine from the displacement sensor signal whether the wing section is in the higher operating range and, upon determining that the wing section is in the higher operating range: apply an inboard correction factor to the inboard height sensor signal to generate an inboard control signal, and apply an outboard correction factor to the outboard height sensor signal to generate an outboard control signal, with the outboard correction factor being greater in magnitude than the inboard correction factor.

The signal conditioning unit also may be configured to determine from the displacement sensor signal whether the wing section is in the lower operating range and, upon determining that the wing section is in the lower operating range: apply an inboard correction factor to the inboard height sensor signal to generate an inboard control signal, and apply an outboard correction factor to the outboard height sensor signal to generate an outboard control signal, with the outboard correction factor being greater in magnitude than the inboard correction factor.

In another exemplary embodiment, there is provided an agricultural combine having a chassis, a header movably connected to the chassis by a movable mount, and a combine control system configured to operate the movable mount to change an orientation of the header relative to the chassis. The header includes a center section extending from a first end to a second end, and a first wing section movably attached to the first end of the center section, the first wing section being movable relative to the center section through a respective range of motion comprising a lower operating range including a lowest operating position, a higher operating range including a highest operating position, and a median operating range between the lower operating range and the higher operating range. A first displacement sensor indicates a position of the first wing section within the respective range of movement. A first inboard height sensor is located between a centerline of the center section and a distal end of the first wing section. A first outboard height sensor is located between the first inboard height sensor and the distal end of the first wing section. A signal conditioning unit is operatively connected to the combine control system, the first displacement sensor, the first inboard height sensor and the first outboard height sensor, and configured to: receive a first displacement sensor signal from the first displacement sensor; receive a first inboard height sensor signal from the first inboard height sensor; receive a first outboard height sensor signal from the first outboard height sensor; determine from the first displacement sensor signal whether the first wing section is in its respective median operating range and, upon determining that the first wing section is in its respective median operating range: apply a first inboard correction factor to the first inboard height sensor signal to generate a first inboard control signal, apply a first outboard correction factor to the first outboard height sensor signal to generate a first outboard control signal, with the first inboard correction factor being greater in magnitude than the first outboard correction factor, and send the first inboard control signal and the first outboard control signal to the combine control system; and determine from the first displacement sensor signal whether the first wing section is in its respective higher operating range and, upon determining that the first wing section is in its respective higher operating range: apply a first inboard correction factor to the first inboard height sensor signal to generate a first inboard control signal, apply a first outboard correction factor to the first outboard height sensor signal to generate a first outboard control signal, with the first outboard correction factor being greater in magnitude than the first inboard correction factor, and send the first inboard control signal and the first outboard control signal to the combine control system.

The agricultural combine header may also include a second wing section movably attached to the second end of the center section, the second wing section being movable relative to the center section through a respective range of motion comprising a lower operating range including a lowest operating position, a higher operating range including a highest operating position, and a median operating range between the lower operating range and the higher operating range. A second displacement sensor may indicate a position of the second wing section within the respective range of movement; and there may be a second inboard height sensor located between the centerline of the center section and a distal end of the second wing section, and a second outboard height sensor located between the second inboard height sensor and the distal end of the second wing section. The signal conditioning unit may be operatively connected to the second displacement sensor, the second inboard height sensor and the second outboard height sensor, and configured to: receive a second displacement sensor signal from the second displacement sensor; receive a second inboard height sensor signal from the second inboard height sensor; receive a second outboard height sensor signal from the outboard height sensor; determine from the second displacement sensor signal whether the second wing section is in its respective median operating range and, upon determining that the second wing section is in its respective median operating range: apply a second inboard correction factor to the second inboard height sensor signal to generate a second inboard control signal, apply a second outboard correction factor to the second outboard height sensor signal to generate a second outboard control signal, with the second inboard correction factor being greater in magnitude than the second outboard correction factor, and send the second inboard control signal and the second outboard control signal to the combine control system; and determine from the second displacement sensor signal whether the second wing section is in its respective higher operating range and, upon determining that the second wing section is in its respective higher operating range: apply a second inboard correction factor to the second inboard height sensor signal to generate a second inboard control signal, apply a second outboard correction factor to the second outboard height sensor signal to generate a second outboard control signal, with the second outboard correction factor being greater in magnitude than the second inboard correction factor, and send the second inboard control signal and the second outboard control signal to the combine control system.

In another exemplary aspect, there is provided a method for operating a header on an agricultural combine located on a surface. The method includes: measuring a displacement of an outboard portion of the header relative to an inboard portion of the header; receiving a first measured distance between the inboard portion and the surface, and a second measured distance between the outboard portion and the surface, the first measured distance and the second measured distance comprising a height data set; determining whether the displacement indicates a relatively low degree of displacement of the outboard portion relative to the inboard portion or a relatively high degree of displacement of the outboard portion relative to the inboard portion; upon determining that the displacement indicates a relatively low degree of displacement, generating from the height data set a first control signal comprising a respective inboard height signal and a respective outboard height signal in which the magnitude of the inboard height signal is increased relative to the magnitude of the outboard height signal; and upon determining that the displacement indicates a relatively high degree of displacement, generating from the height data set a second control signal comprising a respective inboard height signal and a respective outboard height signal in which the magnitude of the outboard height signal is increased relative to the magnitude of the inboard height signal.

BRIEF DESCRIPTION OF THE DRAWINGS

Embodiments of inventions will now be described, strictly by way of example, with reference to the accompanying drawings, in which.

DETAILED DESCRIPTION OF THE DRAWINGS

Figure 1:
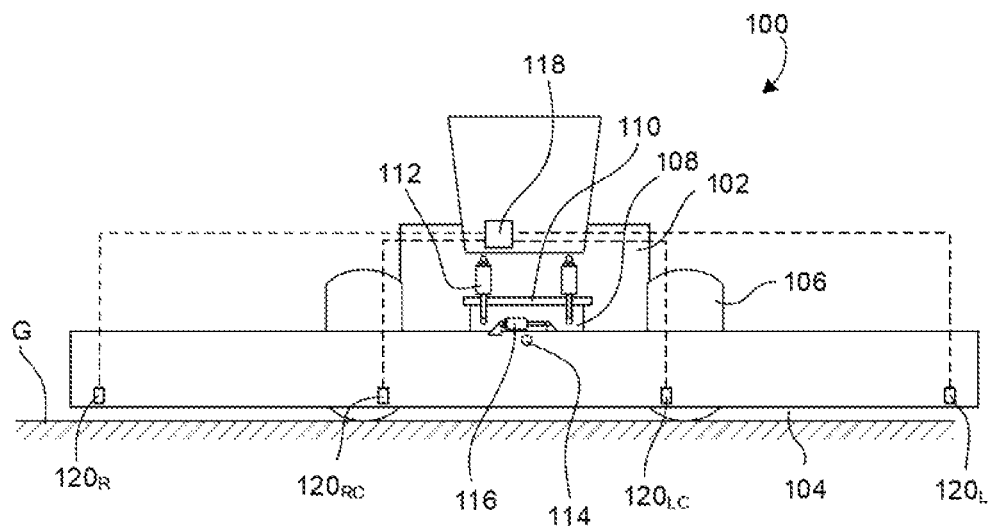
FIG. 1 is a schematic front view of a prior art agricultural vehicle having a unitary header.

The drawing figures depict one or more implementations in accordance with the present concepts, by way of example only, not by way of limitations. In the figures, like reference numerals refer to the same or similar elements.

Figure 2:
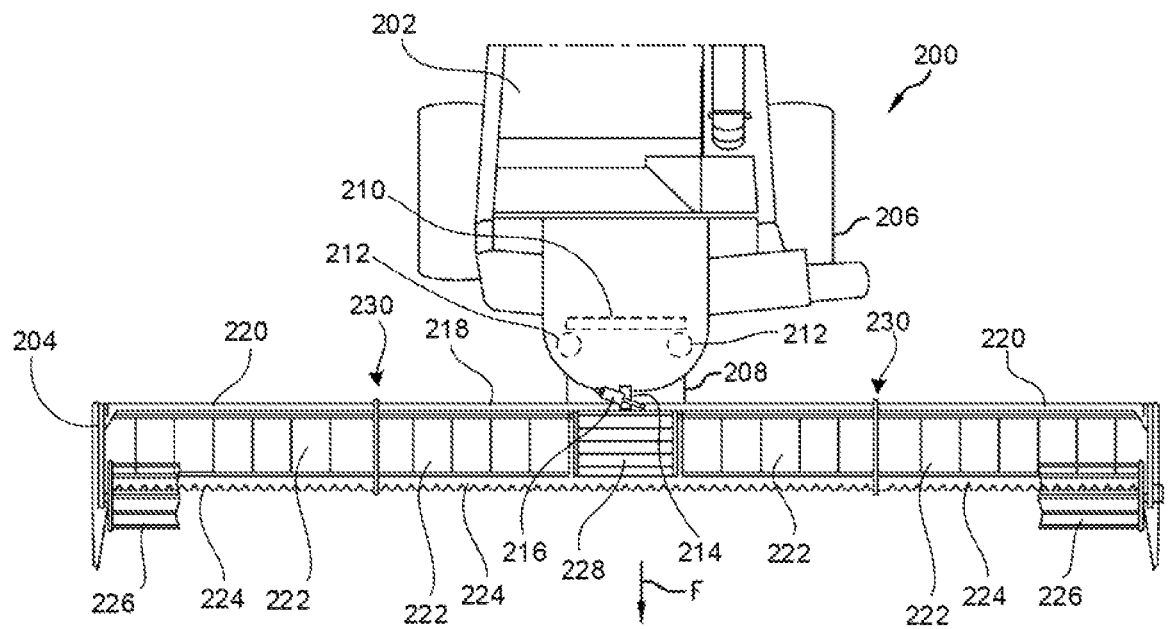
FIG. 2 is a top view of an agricultural vehicle having an articulated header.

Referring to FIG. 2, there is shown an exemplary embodiment of an agricultural vehicle 200 in the form of a combine harvester which generally includes a chassis 202 and a header 204 carried by the chassis 202. The chassis 202 is supported on driving wheels 206 or tracks, as known in the art, and configured to move in a forward direction, illustrated as arrow F, during harvesting operations. For simplicity, only the front portion of the vehicle 200 is shown in the top view of FIG. 1.

The header 204 is connected to the chassis 202 by a mount 208. The mount 208 may comprise a feeder house or grain conveyor configured to collect crop material and direct it to the inner workings of the vehicle 200. Such inner workings typically will also include additional systems for the separation and handling of collected crop material, such as threshers, separators, grain elevators, a grain tank, a straw chopper and spreader, and so on. Such additional systems are known in the art and omitted from view for brevity of description. It should also be appreciated that the header 204 described and illustrated herein does not necessarily need to be included on a combine harvester, but can be incorporated in other agricultural vehicles such as mowers.

The mount 208 is an articulated connection comprising one or more linkage arms, controllers (e.g., hydraulic pistons), or the like to control the position of the header 204 relative to the chassis 202, such as known in the art. For example, the mount 208 may comprise a feeder housing or other rigid structure that is attached to the chassis by a lateral pivot 210 (i.e., a pivot having a rotation axis extending laterally in the horizontal plane relative to the forward direction F) that permits the mount 208 to pivot up and down relative to the chassis 202. One or more actuators 212 are provided between the chassis 202 and the feeder housing to control the vertical position of the end of the mount 208, and thereby control the vertical position of the header 204 attached to the end of the mount 208. The mount 208 also may allow rotational movement between the header 204 and the chassis 202. For example, the mount 208 may include a longitudinal pivot 214 at a distal end of the feeder housing. The longitudinal pivot 214 has a pivot axis that is generally aligned with the forward direction F, but this pivot axis may be tilted through a range of angles as the feeder housing is pivoted up and down. One or more actuators 216 may be provided to rotate the header 204 about the longitudinal pivot 214.

Other embodiments may use any suitable arrangement of parts and controllers to control motion of the header 204 relative to the chassis 202. For example, the two actuators 212 may be attached to extend between the chassis 202 and the header 204 (rather than connecting to the intervening structure of the mount 208), and operated together to control both elevation and tilt of the header 204. Other alternatives and variations will be apparent to persons of ordinary skill in the art in view of the present disclosure, and the invention is not intended to be limited to any particular mechanisms for providing the relative motion or motion control between the header 204 and chassis 202.

The header 204 is an articulated (or "segmented") header having a center section 218 that extends from a first lateral end to a second lateral end, and a wing section 220 attached at each lateral end of the center section 218. The wing sections 220 are movably attached to the respective end of the center section 218 to extend laterally therefrom.

The center section 218 and wing sections 220 may include any suitable operating mechanisms, such as mowers, seeders, tilling mechanism, and so on. For example, in the shown embodiment, the center section 218 and wing sections 220 comprise a so-called draper head, in which each section 218, 220 includes a respective conveyor system 222, cutter system 224 and reel system 226 (the reels 226 are partially omitted to show underlying parts more clearly). The conveyor systems 222 on the wing sections 220 are configured to move crop material towards the center section 218 (and the mount 208). The center section 218 has two conveyor systems 222 that move crop material received from the wing sections 220 towards the mount 208. At the middle of the center section 218, there is a feeder conveyor 228 that collects the crop material from the conveyor systems 222 and directs it into the vehicle 200 for further processing. The conveyor systems 222 may comprise conveyor belts, augers, or the like. The cutter systems 224 are provided to cut crop material from the ground, and the reel systems 226 help hold, lift and move the crop material towards the conveyor systems 222. The general details and features of the conveyor systems 222, cutter systems 224, and reel systems 226 will be understood by persons of ordinary skill in the art, and need not be described herein in detail.

Figure 3:
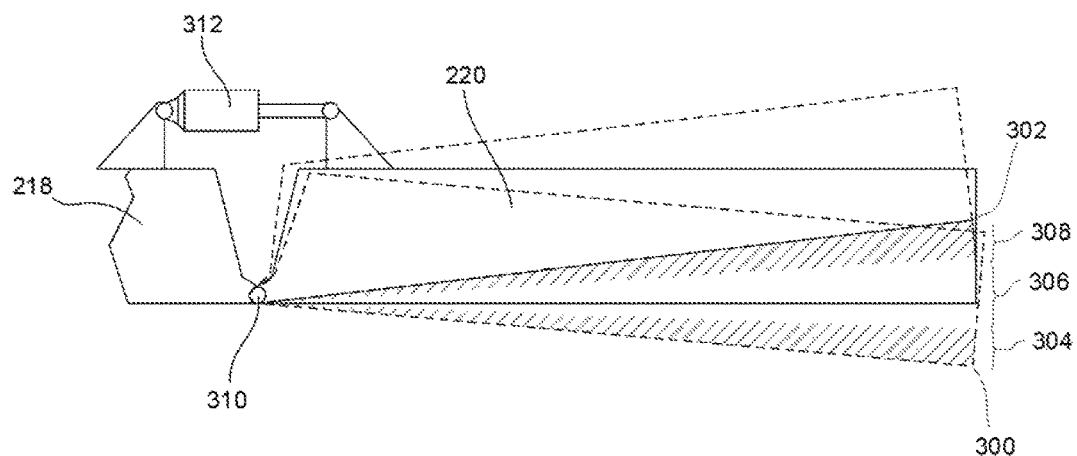
FIG. 3 is a partial front view of an agricultural combine header having an articulated wing section showing its range of movement during normal operation.

The wing sections 220 are movably connected to the center section 218 by respective articulated joints 230. The articulated joints 230 allow the wing sections 220 to move, relative to the center section 218, through a range of motion such as shown in FIG. 3. Each wing section 220 can move from a lowest operating position 300 to a highest operating position 302. The span between the lowest operating position 300 and the highest operating position 302 defines a range of motion including a lower operating range 304 (which includes the lowest operating position 300), a median operating range 306, and a higher operating range 308 (which includes the highest operating position 302). The range of motion defines the normal operating range of the wing section 220. The terms "lower" and "higher" are used in this context to describe relative positions in the vertical (i.e., gravitational), and not positions relative to other parts of the header 204. Thus, while FIG. 3 shows the lower operating range 304 the wing section 220 being below the center section 218, and the higher operating range 308 the wing section 220 being above the center section 218, this is not strictly required. For example, if the lowest operating position 300 is at the same height as the center section 218 or just below it, then the lower operating range may extend entirely or mostly above the center section 218. It is also understood that the wing sections 220 may be movable beyond the normal operating range during transport or during special operations (e.g. operating the combine to harvest without using the wing section).

Any type of articulated joints 230 may be used to provide relative movement between the wing sections 220 and the center section 218. For example, the articulated joints 230 may comprise pivot connectors 310 (FIG. 3) that are oriented with one or more pivot axes extending parallel to the forward direction F (see, e.g., U.S. Pat. Pub. No. 2019/0000014). The articulated joints 230 also may allow pivoting movement relative to the center section 218 about multiple axes of rotation (see, e.g., U.S. Pat. Pub. No. 2018/0303029). The articulated joints 230 also may comprise linkages to allow relative translational movement without corresponding relative angular movement, or angular movement about a virtual pivot axis (see, e.g., U.S. Pat. Nos. 9,992,924 and 10,070,575). The articulated joints 230 also may include respective control mechanisms, such as electric motors, hydraulic or pneumatic piston and cylinder actuators 312 or the like, to control the position of the wing section 220 relative to the center section 218.

Any variety of mechanisms may be used to provide relative movement between the various parts. For example, the actuators 212, 216 that control the position of the header 204 relative to the chassis 202, and the actuators that control the positions of the wing sections 220 relative to the center section 218, may comprise any suitable movable linkage mechanism. In FIG. 2, the actuators 212, 216 are shown as pressurized actuators, such as pneumatic or hydraulic piston and cylinder assemblies that are operated by valves and a source of pressurized fluid (gas, oil, etc.). In this case, the piston/cylinder assembly provides a movable linkage in the form of an adjustable-length telescoping connector. The various actuators alternatively may comprise electric motors, pressure-operated rotational drives, and so on as the power supply, and other kinds of movable linkage to provide the desired controlled movement. For example, an electric motor may be provided to drive a worm gear that engages a corresponding nut to provide an alternative telescoping linkage. One or more actuators may be bidirectional (e.g., able to forcibly move the header 204 or wing section 220 both up and down), or unidirectional (e.g., only able to lift the header 204 or wing section 220, while lowering is achieved by gravity). The actuators also may include any suitable drive mechanisms to convert a motive force to the desired type of motion, such as gears, drive shafts, worm screws, and so on. These and other such actuators and others are known in the art, and need not be described in more detail herein.

One preferred embodiment includes a center section 218 and two wing sections 220, but other embodiments may include only one wing section 220, or multiple center sections 218. Other variations are also possible.

Figure 4:
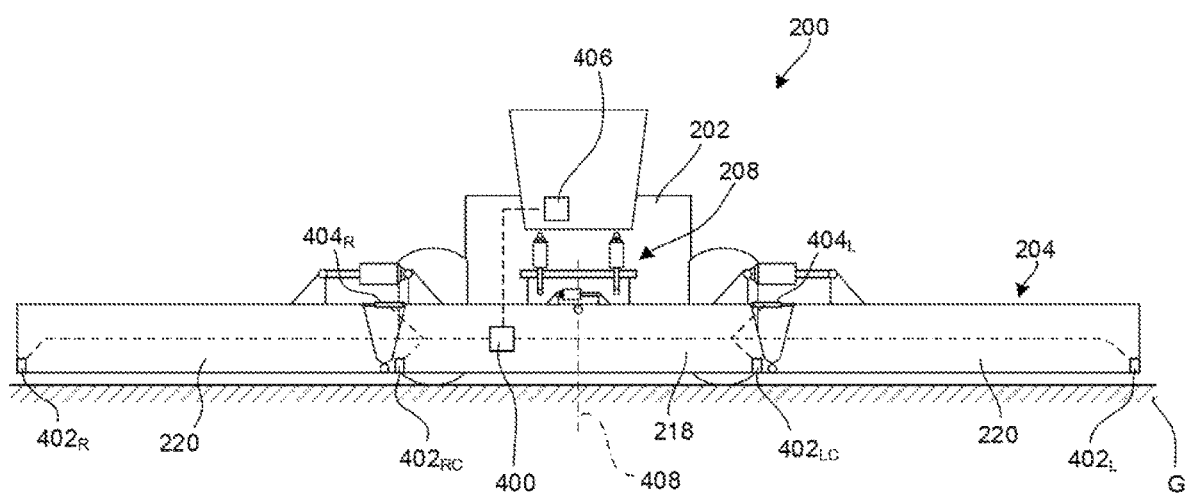
FIG. 4 is a schematic front view of a combine and articulated header, showing a control system and associated sensors.
Figure 5:
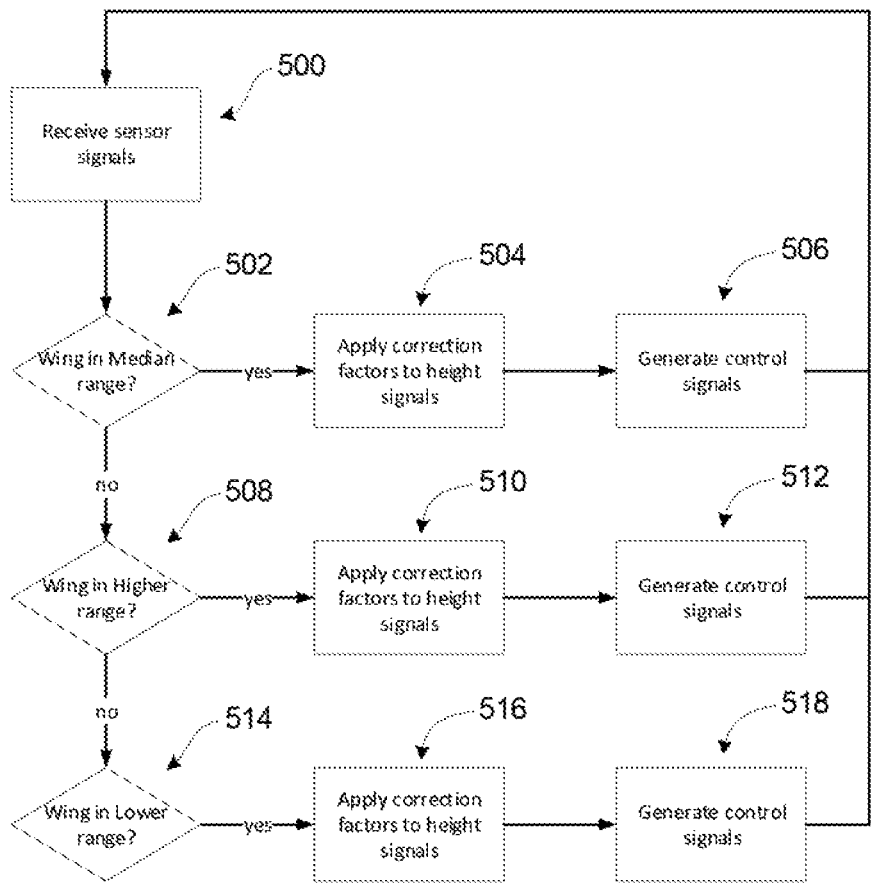
FIG. 5 illustrates an example of a control system operating algorithm.
Figure 6:
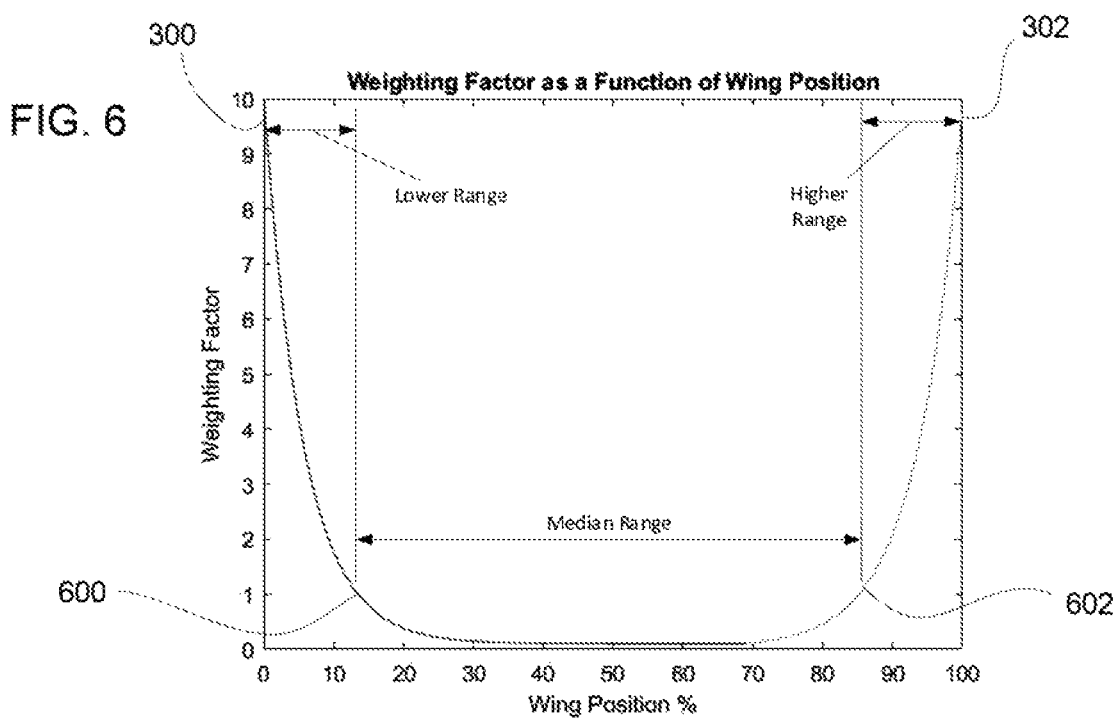
FIG. 6 illustrates an example of a correction factor that may be used to control the position of a header relative to a combine chassis.

Referring now to FIGS. 4 through 6, a control system and associated components for an articulated header 204 are described in detail. The control system and associated components are part of an agricultural combine vehicle 200 such as discussed above, having a chassis 202, an articulated header 204 and a mount 208. As before, the mount 208 is operable to move the header 204 relative to the chassis 202. The header 204 has a center section 218 and a wing section 220 attached at each lateral end of the center section 218. In general terms, the exemplary control system includes a signal conditioning unit 400, ground height sensors 402, displacement sensors 404 and a combine control system 406. The ground height sensors 402 and displacement sensors 404 are operatively connected to the signal conditioning unit 400 by electrical wiring or wireless communication transmitters and/or receivers. The signal conditioning unit 400 is operatively connected to the combine control system 406 in a similar manner.

The ground height sensors 402 are configured to emit a signal representative of the distance to the ground G. The ground height sensors 402 may comprise any suitable distance-measuring device that is operable in the context of a harvesting combine. For example, the ground height sensors 402 may comprise ultrasonic, optical or radar rangefinders. The ground height sensors 402 also may comprise a mechanical drag arm (i.e., feeler) or drag wheel that is connected to the header 204 by a linear or angular potentiometer to measure distance as a function of changing resistance of the potentiometer, such as known in the art.

The ground height sensors 402 are mounted to the header 204 at various locations, and calibrated to provide a signal representing the distance between the ground G and the location on the header 204 at which the sensor is attached. In the shown example, there are four ground height sensors 402: an outboard left sensor $402_L$, an inboard left sensor $402_{LC}$, an outboard right sensor $402_R$ and an inboard right height sensor $402_{RC}$ (the view in FIG. 4 is from the front, thus "right" and "left" are reversed in this view). The outboard height sensors $402_L$ and $402_R$ are located on the wing sections 220, with one sensor at the distal end of its respective wing section 220 (i.e., at or near the end located more remotely from the center section 418). Each inboard height sensor $402_{LC}$ and $402_{RC}$ is located between a centerline 408 of the center section 218 and the respective outboard height sensor $402_L$, $402_R$. The inboard height sensors $402_{LC}$, $402_{RC}$ may be positioned on the center section 418, as shown, or on proximal ends of the wing sections 220 (i.e., the ends closest to the center section 418).

The displacement sensors 404 are operatively connected to the center section 218 and/or wing sections 220, and each displacement sensor 404 is configured to measure changes in the position of a respective wing section 220 relative to the center section 218. In the shown example, the displacement is angular rotation, and each wing section has an associated displacement sensor 404; namely, a left displacement sensor $404_L$ to measure the angle of the left wing section 220, and a right displacement sensor $404_R$ to measure the angle of the right wing section 220. The displacement sensors 404 may comprise any mechanism suitable for measuring the relative angle between two parts. For example, as shown in FIG. 4, each displacement sensor 404 may comprise a linear potentiometer connected between the center section 218 and the respective wing section 220 and configured to extend and retract as the wing section 220 moves, thus providing a variable resistance indicative of the wing section's position. Alternatively, the displacement sensors 404 may comprise angular potentiometers, range finders (e.g., ultrasonic, optical, or electromagnetic (radar)) that evaluate distance between facing parts of the center section 418 and wing section 420. The displacement sensors 404 also may comprise gyroscopes, such as solid state angular accelerometers that are mounted on the center section 218 and wing section 220 to provide a measure of relative linear and/or angular movement.

The sensor devices discussed as examples of height sensors 402 and displacement sensors 404 are readily available, and their installation and use will be understood by those of ordinary skill in the art in view of the present disclosure. Other alternatives and variations will be apparent to persons of ordinary skill in the art in view of the present disclosure.

The signal conditioning unit 400 is configured to receive signals output from the height sensors 402 and displacement sensors 404. For example, the sensors may periodically generate signals or the signal conditioning unit 400 may periodically query the sensors to transmit: inboard height sensor signals from the inboard height sensors $402_{LC}$, $402_{RC}$, outboard height sensor signals from the outboard height sensors $402_L$, $402_R$, and displacement sensor signals from the displacement sensors $404_L$, $404_R$. Such signals may be conditioned in any suitable way to provide a reliable and robust indication of the respective measurement. For example, analog-to-digital converters, bandpass filters, and the like may be integrated into the sensors or conditioning unit 400 to clean up the signals.

The signal conditioning unit 400 performs operations on the received signals to generate output control signals that are used by the combine control system 406 to move the mount 408 and header 204 appropriately over uneven terrain. In this case, the combine control system 406 may comprise a conventional control system for use with a unitary header. The combine control system 406 receives four sensor inputs: inboard height sensor signals from the inboard height sensors $402_{LC}$, $402_{RC}$, and outboard height sensor signals from the outboard height sensors $402_L$, $402_R$. These four inputs indicate the current height and tilt of the header 204 relative to the ground. The combine control system 406 uses this information to control the actuators 212, 216 to place the header 204 into a better or more uniform position over the ground, with the ideal position typically being to have all four height sensors registering the same or similar height above the ground, and the height value being appropriate for the crop conditions.

A typical conventional combine control system 406 generates control outputs for the actuators 212, 216 by averaging the sensor signals on the two sides of the header 204. For example, the combine control system 406 averages the values of the left-side inboard height sensor signal and the left-side outboard height sensor signal to determine a left-side average height, and averages the values of the right-side inboard height sensor signal and the right-side outboard height sensor signal to determine a right-side average height. Based on these two values, the combine control system 406 issues control signals to raise, lower, or tilt the header. For example, if the left-side average height is above the desired cutting height, and the right-side average height is below the desired cutting height, the combine control system 406 will generate commands to tilt the header 204 downward on the left side and upwards on the right side. Similarly, if the left-side and right-side average heights are all above the desired cutting height, the combine control system will generate commands to lower the entire header 204. Of course, combinations of commands can also be issued to account for provide combined tilting and height adjustments.

Such a control algorithm may not suitable if the unitary header is replaced by a segmented header. For example, the combine control system 406 may not perceive when a wing section reaches the upper extent of is movement relative to the center section, and be unable to react quickly enough to prevent the end of the wing section from digging into the ground as the terrain becomes more uneven. To address issues such as this, the signal conditioning unit 400 converts the inputs from the height sensors into a format that causes the conventional combine control system 406 to react more appropriately to changing terrain conditions. In particular, the signal conditioning unit 400 operates by biasing the control towards the inboard height sensor signals when the wing sections are in their median operating range, and biasing control towards the outboard height sensor signals when the wing sections are in their higher and/or lower operating ranges.

One exemplary process for doing so is shown in FIG. 5. In this process, the signal conditioning unit 400 performs a looping process to generate control signals that are sent to the combine control system 406. The shown process is an example for an embodiment having a single wing section having a single displacement sensor, a single inboard height sensor and a single outboard height sensor, but other embodiments may include additional wing sections and sensors.

At step 500, the signal conditioning unit 400 receives a displacement sensor signal, an inboard height signal and an outboard height signal. In step 502, the signal conditioning unit 400 evaluates the displacement sensor signal to determine whether the wing section is positioned within a predetermined median operating range. As noted above, the median operating range is a range of movement between the extreme ends of movement during normal operation. This determination can be made, for example, by evaluating whether the calibrated output of the displacement sensor 404 lies within a predetermined range of sensor output values (e.g., voltages, resistance, etc.) corresponding to positions within the median operating range. If the wing section is determined to be in the median operating range, then the signal conditioning unit 400 proceeds to step 504.

In step 504, the signal conditioning unit 400 applies an inboard correction factor to the inboard height signal, and applies an outboard correction factor to the outboard height signal. The purpose of the correction factors is to alter one or both of the height signals. The inboard and outboard correction factors preferably are numerical values that are applied to the height signals to vary one or both of the height signals. For example, a correction factor might have a value of one (1) to maintain a height signal at its original value, or it may have a value below one (e.g., 0.5) to reduce the magnitude of the height signal, or it may have a value above one (e.g. 5) to increase the magnitude of the height signal. In the case of step 504—i.e., when the wing section is in the median operating range—the magnitude of the inboard correction factor is greater than the magnitude of the outboard correction factor. Thus, when the signal conditioning unit 400 applies the inboard correction factor to the inboard height signal and the outboard correction factor to the outboard height signal, the magnitude of the inboard height signal increases relative to the magnitude of the outboard height signal.

The relative change in values provided by the application of the correction factors can be accomplished in various different ways. This can be done, for example, by: maintaining the inboard height signal at its original magnitude and decreasing the magnitude of the outboard height signal, increasing the magnitude of the inboard height signal and decreasing the magnitude of the outboard height signal, increasing the magnitude of the inboard height signal and maintaining the magnitude of the outboard height signal at its original value; decreasing the magnitude of the inboard height signal and decreasing the value of the outboard height signal by a greater amount; or increasing the magnitude of the inboard height signal and increasing the magnitude of the outboard height signal by a lesser amount.

In step 506, the signal conditioning unit 400 generates an inboard control signal and an outboard control signal, which are sent to the combine control system 406. The inboard control signal represents the inboard height signal with the inboard correction factor applied to it, and the outboard control signal represents the outboard height signal with the outboard correction factor applied to it. The combine control system 406 then uses these control signals to determine how to move the mount 208 and/or header 204 to account for ground conditions. To facilitate this, the signal conditioning unit 400 may normalize the values of the inboard and outboard control signals to values that the combine control system 406 can use properly. For example, after applying the correction factors the resulting control signals may be scaled up or down to be within a range of values that the combine control system 406 is expecting to see.

From the foregoing, it will be understood that when the wing section is in the median operating range, the inboard control signal is given relatively higher value than the outboard control signal. Thus, the combine control system 406 will be biased to act according to the value of the original inboard height signal measurement.

If it is determined in step 502 that the wing section is not in the median operating range, then the signal conditioning unit 400 proceeds to step 508. Here, the process determined whether the wing section 112 is in the higher operating range. If the wing section 112 is in the higher operating range, then the process moves to step 510, in which the signal conditioning unit 400 applies an inboard correction factor to the inboard height signal, and applies an outboard correction factor to the outboard height signal. In this case the magnitude of the inboard correction factor is less than the magnitude of the outboard correction factor. Thus, when the signal conditioning unit 400 applies the inboard correction factor to the inboard height signal and the outboard correction factor to the outboard height signal, the magnitude of the inboard height signal decreases relative to the magnitude of the outboard height signal.

Similarly to step 504, the relative change in values provided by the application of the correction factors in step 510 can be accomplished in various different ways. This can be done, for example, by: maintaining the inboard height signal at its original magnitude and increasing the magnitude of the outboard height signal, decreasing the magnitude of the inboard height signal and increasing the magnitude of the outboard height signal, decreasing the magnitude of the inboard height signal and maintaining the magnitude of the outboard height signal at its original value; decreasing the magnitude of the inboard height signal and decreasing the value of the outboard height signal by a lesser amount; or increasing the magnitude of the inboard height signal and increasing the magnitude of the outboard height signal by a greater amount.

In step 512, the signal conditioning unit 400 generates an inboard control signal and an outboard control signal, which are sent to the combine control system 406. As before, the inboard control signal represents the inboard height signal with the inboard correction factor applied to it, and the outboard control signal represents the outboard height signal with the outboard correction factor applied to it. The combine control system 406 then uses these control signals to determine how to move the mount 208 and/or header 204 to account for ground conditions. Again, the signal conditioning unit 400 may normalize the values of the inboard and outboard control signals to values that the combine control system 406 can use properly. For example, after applying the correction factors the resulting control signals may be scaled up or down to be within a range of values that the combine control system 406 is expecting to see.

From the foregoing, it will be understood that when the wing section is in the higher operating range, the outboard control signal is given relatively higher value than the inboard control signal. Thus, the combine control system 406 will be biased to act according to the value of the original outboard height signal measurement.

If it is determined in step 508 that the wing section 112 is not in the higher range, then the process proceeds to step 514, in which the signal conditioning unit 400 defaults to concluding that the wing section 112 is in the lower operating range. The signal conditioning unit 400 then applies correction factors to the inboard and outboard height signals in step 516 and generates corresponding control signals in step 518. The correction factors applied in step 516 may be selected to bias the combine control system 406 to act according to the value of the original outboard signal measurement. The correction factors in step 516 may be different from the correction factors applied in step 510, so that the biasing effect caused by positioning the wing section 112 in the lower range is different from the biasing effect caused by positioning the wing section 112 in the higher range. Alternatively, the correction factors applied in step 516 may be the same as the correction factors applied in step 510, in which the process flow of steps 514 through 518 can be accomplished by simply replacing step 508 with a determination that that wing section 112 is in the higher or lower operating range. It is also envisioned that the correction factors applied in step 516 can be similar to those applied in step 504 (i.e., increasing the inboard signal relative to the outboard signal), or the correction factors may be unitary (i.e., no correction factor applied) such that motion of the wing section into the lower operating range does not affect the operation of the combine control system 406.

The specific values of the correction factors may be adjusted according to operating conditions, the desired behavior of the header 204, and the particular details of the original combine control system's operation. The correction factors also may comprise any desired values, which may be stored or generated in any suitable way. For example, the correction factors may be applied using mathematical functions, or by looking up values in a lookup table, based on the exact position of the wing section within its range of movement. The correction factors applied in the one or more operating ranges also may comprise static values that do not change as a function of the wing section's particular position within the median operating range. For example, the inboard and outboard correction factors applied in the median operating range may be fixed values. One of the correction factors also may be fixed throughout the entire operating range of the wing section (e.g., fixed at a value of 1 so that the associated height signal remains unmodified), while the other correction factor varies to provide the desired biasing function.

It is expected that the responsiveness of the combine control system 406 can be improved by increasing the bias towards the outboard height sensor as a function of the proximity of the wing section 112 to the highest operating position. FIG. 6 shows an example of a plot of outboard correction factor magnitude as a function of wing position. Here, the wing position is measured using the displacement sensor 404 as a percentage of its height within the total range of movement. The lower operating range extends from the lowest position to about 13% of the height from the lowest position, and the higher operating range extends from about 87% of the height from the lowest position to the highest operating position. The median operating range extends between the lower operating range and the higher operating range. In this case, the "weighting factor" indicates a normalized measurement of the outboard correction factor versus the inboard correction factor (i.e., the inboard correction factor is unitary and the outboard correction factor changes a function of wing position).

As can be seen from this plot, the normalized outboard weighting factor has a value less than one in the median operating range, and so the inboard correction factor is greater in magnitude than the outboard correction factor when the wing section is in the median operating range. Similarly, the normalized outboard weighting factor has a value that is greater than one in the higher and lower operating ranges, and so the outboard correction factor is greater in magnitude than the inboard correction factor when the wing section is in the higher and lower operating ranges. FIG. 6 also demonstrates an example of the outboard correction factor increasing as a function of proximity to the highest operating position. In this example, this increasing function begins while the wing section is still in the median range, but this is not strictly required. In this example, the increasing function is also an exponential increase, but a linear increase or stepwise increase may alternatively be used. Also, the outboard correction factor has a maximum magnitude when the wing section is in the highest operating position.

In this example, the outboard correction factor also increases as a function of proximity to the lowest operating position. The shape of the weighting factor's curve in the lower operating range may mirror the shape in the higher operating range (e.g., by being exponentially increasing and having a maximum value in the lowest operating position), but this is not strictly required. For example, the maximum value of the outboard weighting factor when the wing section is in the lower operating range may be greater than or less than the maximum value of the outboard weighting factor when the wing section is in the higher operating range, or it may be linear instead of exponential. Other alternatives and variations will be apparent to persons of ordinary skill in the art in view of the present disclosure.

The correction factor illustrated in the embodiment of FIG. 6 or other embodiments may be applied in any suitable way to alter the height sensor signals to generate the desired control signals. For example, in one embodiment, the combine control system 406 might be programmed to average the value of the signals provided by the outboard left sensor 402$_L$ and inboard left sensor 402$_{LC}$ to generate an appropriate actuator command using the following equation: $Y_L = L/2 + LC/2$, where $Y_L$ is the desired height position of the left-side header actuator, L is the magnitude of the received outboard left sensor 402$_L$ signal, and LC is the magnitude of the received inboard left sensor 402$_{LC}$ signal. When the combine is used with a rigid header, the signals received by the combine control unit 406 are the unmodified signals sent by the outboard left sensor 402$_L$ and the inboard left sensor 402$_{LC}$. However, when the combine is used with a segmented header 204, the signals received by the combine control unit 406 are sent from the sensors 402$_L$ and 402$_{LC}$ by way of the signal conditioning unit 400, which modifies one or both of the original signal magnitudes to apply the correction factor. For example, the signal conditioning unit may multiply the measured outboard sensor value L by an outboard correction factor $C_1$, and multiply the measured inboard sensor value LC by an inboard correction factor $C_2$. Thus, with the signal conditioning unit 400 operating between the sensors 402$_L$, 402$_{LC}$ and the combine control system 406, the combine control system 406 will, in effect, determine the value $Y_L$ using the equation: $Y_L = C_1 L/2 + C_2 LC/2$, wherein $C_1$ is the outboard correction factor, and $C_2$ is the inboard correction factor, and the remaining variables are as noted above.

The values of $C_1$ and $C_2$ may be linked together as a function of a single variable using the following two equations: $C_1 + C_2 = 2$; and $C_1 = Y_W C_2$; where $Y_W$ is equal to the normalized value of the correction factor illustrated in FIG. 6. Applying the foregoing formulae, at points 600 and 602 in FIG. 6, $Y_W$ equals one, and $C_1$ equals $C_2$. In these states, the correction factors are balanced, and the signal conditioning unit 400 will multiply the inboard sensor signal and outboard sensor signal by one, and so no change is made to either signal and the combine control system 406 will operate as it would if a rigid header were in place. Points 600 and 602 represent the transitions between the lower operating position and median operating position, and between the median operation position and higher operating position, respectively. Below point 600, $Y_W$ is greater than one, so $C_1$ will be greater than $C_2$, and according to the above equations, the value for $Y_L$ will be biased towards the outboard sensor signal value L. The same is true above point 602. Between points 600 and 602—i.e., in the median operating range—$Y_W$ is less than one, so $C_1$ will be less than $C_2$, and the value for YL will be biased towards the inboard sensor signal.

The foregoing example is directed to the operation of a single wing section on a segmented header, but similar or identical processes may be implemented if a second wing section is provided. Furthermore, the generated correction factors for one wing section also may take into consideration the position of the other wing section. For example, if both wing sections are in the higher operating range, the outboard correction factors for both wing sections may be increased more than if a single wing section was in the higher operating range. Other alternatives and variations will be apparent to persons of ordinary skill in the art in view of the present disclosure.

It is believed that the foregoing embodiments will provide a more robust control algorithm to prevent the distal tips of the wing section from missing crop in low-lying areas or digging into the ground at raised areas. Specifically, as the wing section 112 reaches the extent of its travel, the sensitivity of the outboard height sensor increases, leading to greater output by the combine control system 406 to react to changes in height at the outboard height sensor.

Also, when the wing sections are in the median position, the bias of the outboard height sensor can be decreased relative to that of the inboard height sensor, which can be helpful to prevent the combine control system 406 from attempting to make adjustments that would not be corrected in any event. For example, if the center section is at a suitable height above the ground as indicated by the inboard height sensors, it is expected that the wing sections will "float" up and down to accommodate undulations in the terrain outboard of the center section. Thus, if an outboard height sensor issues a signal indicating that it is higher than desired, changing the height of center section is not likely to have any effect on the height of the outboard end of the wing section. Thus, reducing the bias of the outboard sensors may help prevent unnecessary and potentially counterproductive height or tilt adjustments.

It will also be understood that embodiments can be integrated into existing combine header control systems without any modification to the existing system. For example, a header assembly may be provided having the signal conditioning unit and related sensors pre-installed and ready to connect directly to a combine to replace a rigid header. However, it is also envisioned that the combine control system can be modified to incorporate the functionality of the signal conditioning unit via a software update or other modification.

Figure 7:
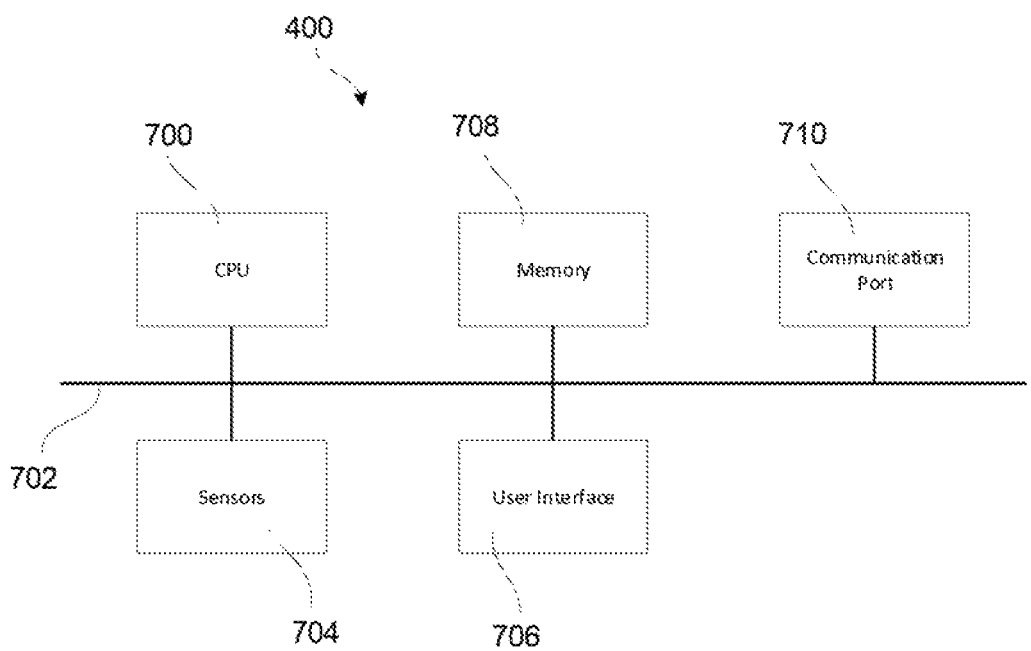
FIG. 7 is a schematic view of a control system.

The signal processing unit 400 that may be implemented using any suitable arrangement of processors and logical circuits. FIG. 7 is a block diagram of exemplary hardware and computing equipment that may be used as a signal processing unit 400 as discussed herein. The signal processing unit 400 includes a central processing unit (CPU) 700, which is responsible for performing calculations and logic operations required to execute one or more computer programs or operations. The CPU 700 is connected via a data transmission bus 702, to sensors 704 (e.g., sensors 402 and 404), a user interface 706, and a memory 708. The user interface 706 may comprise any suitable connection port or the like for programming and customizing the operation of the signal processing unit 400. For example, a serial bus may be provided to connect to a computer having software suitable for changing the manner in which the correction factors are applied, calibrating sensors, and the like. The signal processing unit 400 also has a communication port 710 that is operatively connected (wired or wirelessly) to the combine control system 406 for transmitting control signals, as discussed herein. One or more analog to digital conversion circuits may be provided to convert analog data from the sensors 704 to an appropriate digital signal for processing by the CPU 700, as known in the art.

The CPU 700, data transmission bus 702 and memory 710 may comprise any suitable computing device, such as an INTEL ATOM E3826 1.46 GHz Dual Core CPU or the like, being coupled to DDR3L 1066/1333 MHz SO-DIMM Socket SDRAM having a 4 GB memory capacity or other memory (e.g., compact disk, digital disk, solid state drive, flash memory, memory card, USB drive, optical disc storage, etc.). The selection of an appropriate processing system and memory is a matter of routine practice and need not be discussed in greater detail herein.

Embodiments may be provided in various forms. In one instance, an embodiment may comprise an entire vehicle and header assembly, and the signal conditioning unit and control system may be integrated into the header or into the vehicle. In another instance, an embodiment may comprise a segmented header and an associated control system. In another instance, an embodiment may comprise a single header wing section and an associated control system. Embodiments also may be used in headers that do not have specific mechanical pivots or articulated joints, but nonetheless are expected to experience significant magnitudes of displacement along the width of the header. Other configurations may be used in other embodiments.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A header for an agricultural vehicle, the header comprising:

a center section extending from a first end to a second end;

a wing section movably attached to the first end of the center section, the wing section being movable relative to the center section through a range of motion comprising a lower operating range including a lowest operating position, a higher operating range including a highest operating position, and a median operating range between the lower operating range and the higher operating range;

a displacement sensor configured to indicate a position of the wing section within the range of movement;

an inboard height sensor located between a centerline of the center section and a distal end of the wing section;

an outboard height sensor located between the inboard height sensor and the distal end of the wing section; and a signal conditioning unit operatively connected to the displacement sensor, the inboard height sensor and the outboard height sensor, and configured to:

receive a displacement sensor signal from the displacement sensor;

receive an inboard height sensor signal from the inboard height sensor;

receive an outboard height sensor signal from the outboard height sensor;

determine from the displacement sensor signal whether the wing section is in the median operating range and, upon determining that the wing section is in the median operating range: apply an inboard correction factor to the inboard height sensor signal to generate an inboard control signal, and apply an outboard correction factor to the outboard height sensor signal to generate an outboard control signal, with the inboard correction factor being greater in magnitude than the outboard correction factor; and determine from the displacement sensor signal whether the wing section is in the higher operating range and, upon determining that the wing section is in the higher operating range: apply an inboard correction factor to the inboard height sensor signal to generate an inboard control signal, and apply an outboard correction factor to the outboard height sensor signal to generate an outboard control signal, with the outboard correction factor being greater in magnitude than the inboard correction factor.

2. The header of claim 1, wherein the inboard height sensor is located on the center section, and the outboard height sensor is located on the wing section proximal to the distal end of the wing section.

3. The header of claim 1, wherein the wing section is movably attached to the center section by one or more pivots.

4. The header of claim 1, wherein the displacement sensor comprises one or more potentiometers, gyroscopes or optical sensors, and the inboard height sensor and the outboard height sensor each comprise one or more radar rangefinders, optical rangefinders, ultrasonic rangefinders, drag wheels or drag arms.

5. The header of claim 1, wherein, upon determining that the wing section is in the higher operating range, the outboard correction factor increases as a function of proximity to the highest operating position.

6. The header of claim 5, wherein, upon determining that the wing section is in the higher operating range, the outboard correction factor increases exponentially as a function of proximity to the highest operating position.

7. The header of claim 5, wherein the outboard correction factor has a maximum magnitude when the wing section is in the highest operating position.

8. The header of claim 1, wherein the signal conditioning unit is further configured to determine from the displacement sensor signal whether the wing section is in the lower operating range and, upon determining that the wing section is in the lower operating range: apply an inboard correction factor to the inboard height sensor signal to generate an inboard control signal, and apply an outboard correction factor to the outboard height sensor signal to generate an outboard control signal, with the outboard correction factor being greater in magnitude than the inboard correction factor.

9. The header of claim 8, wherein, upon determining that the wing section is in the lower operating range, the outboard correction factor increases as a function of proximity to the lowest operating position.

10. The header of claim 9, wherein, upon determining that the wing section is in the lower operating range, the outboard correction factor increases exponentially as a function of proximity to the lowest operating position.

11. The header of claim 9, wherein the outboard correction factor has a maximum magnitude when the wing section is in the lowest operating position.

12. An agricultural combine comprising:
a chassis;
a header movably connected to the chassis by a movable mount;
a combine control system configured to operate the movable mount to change an orientation of the header relative to the chassis;
wherein the header comprises:

a center section extending from a first end to a second end;
a first wing section movably attached to the first end of the center section, the first wing section being movable relative to the center section through a respective range of motion comprising a lower operating range including a lowest operating position, a higher operating range including a highest operating position, and a median operating range between the lower operating range and the higher operating range;
a first displacement sensor configured to indicate a position of the first wing section within the respective range of movement;
a first inboard height sensor located between a centerline of the center section and a distal end of the first wing section;
a first outboard height sensor located between the first inboard height sensor and the distal end of the first wing section; and
a signal conditioning unit operatively connected to the combine control system, the first displacement sensor, the first inboard height sensor and the first outboard height sensor, and configured to:
receive a first displacement sensor signal from the first displacement sensor;
receive a first inboard height sensor signal from the first inboard height sensor;
receive a first outboard height sensor signal from the first outboard height sensor;
determine from the first displacement sensor signal whether the first wing section is in its respective median operating range and, upon determining that the first wing section is in its respective median operating range: apply a first inboard correction factor to the first inboard height sensor signal to generate a first inboard control signal, apply a first outboard correction factor to the first outboard height sensor signal to generate a first outboard control signal, with the first inboard correction factor being greater in magnitude than the first outboard correction factor, and send the first inboard control signal and the first outboard control signal to the combine control system; and
determine from the first displacement sensor signal whether the first wing section is in its respective higher operating range and, upon determining that the first wing section is in its respective higher operating range: apply a first inboard correction factor to the first inboard height sensor signal to generate a first inboard control signal, apply a first outboard correction factor to the first outboard height sensor signal to generate a first outboard control signal, with the first outboard correction factor being greater in magnitude than the first inboard correction factor, and send the first inboard control signal and the first outboard control signal to the combine control system.

13. The agricultural combine of claim 12, wherein, upon determining that the first wing section is in the higher operating range, the first outboard correction factor has a magnitude that increases as a function of proximity to the respective highest operating position of the first wing section.

14. The agricultural combine of claim 12, further comprising:

a second wing section movably attached to the second end of the center section, the second wing section being movable relative to the center section through a respective range of motion comprising a lower operating range including a lowest operating position, a higher operating range including a highest operating position, and a median operating range between the lower operating range and the higher operating range;
a second displacement sensor configured to indicate a position of the second wing section within the respective range of movement;
a second inboard height sensor located between the centerline of the center section and a distal end of the second wing section;
a second outboard height sensor located between the second inboard height sensor and the distal end of the second wing section; and
wherein the signal conditioning unit is operatively connected to the second displacement sensor, the second inboard height sensor and the second outboard height sensor, and configured to:
receive a second displacement sensor signal from the second displacement sensor;
receive a second inboard height sensor signal from the second inboard height sensor;
receive a second outboard height sensor signal from the outboard height sensor;
determine from the second displacement sensor signal whether the second wing section is in its respective median operating range and, upon determining that the second wing section is in its respective median operating range: apply a second inboard correction factor to the second inboard height sensor signal to generate a second inboard control signal, apply a second outboard correction factor to the second outboard height sensor signal to generate a second outboard control signal, with the second inboard correction factor being greater in magnitude than the second outboard correction factor, and send the second inboard control signal and the second outboard control signal to the combine control system; and
determine from the second displacement sensor signal whether the second wing section is in its respective higher operating range and, upon determining that the second wing section is in its respective higher operating range: apply a second inboard correction factor to the second inboard height sensor signal to generate a second inboard control signal, apply a second outboard correction factor to the second outboard height sensor signal to generate a second outboard control signal, with the second outboard correction factor being greater in magnitude than the second inboard correction factor, and send the second inboard control signal and the second outboard control signal to the combine control system.

15. The agricultural combine of claim 14, wherein, upon determining that the second wing section is in the higher operating range, the second outboard correction factor has a magnitude that increases as a function of proximity to the respective highest operating position of the second wing section.

16. The agricultural combine of claim 14, wherein the signal conditioning unit is further configured to:
determine from the first displacement sensor signal whether the first wing section is in its respective lower operating range and, upon determining that the first wing section is in its respective lower operating range: apply a first inboard correction factor to the first inboard height sensor signal to generate a first inboard control signal, apply a first outboard correction factor to the first outboard height sensor signal to generate a first outboard control signal, with the first outboard correction factor being greater in magnitude than the first inboard correction factor, and send the first inboard control signal and the first outboard control signal to the combine control system; and
determine from the second displacement sensor signal whether the second wing section is in its respective lower operating range and, upon determining that the second wing section is in its respective lower operating range: apply a second inboard correction factor to the second inboard height sensor signal to generate a second inboard control signal, apply a second outboard correction factor to the second outboard height sensor signal to generate a second outboard control signal, with the second outboard correction factor being greater in magnitude than the second inboard correction factor, and send the second inboard control signal and the second outboard control signal to the combine control system.

17. The agricultural combine of claim 12, wherein upon receiving the first inboard control signal and the first outboard control signal, the combine control system is configured to determine an average value of the respective magnitudes of the first inboard control signal and the first outboard control signal, and operate the movable mount to change the orientation of the header relative to the chassis to a new vertical or angular orientation.

18. A method for operating a header on an agricultural combine located on a surface, the method comprising:
measuring a displacement of an outboard portion of the header relative to an inboard portion of the header;
receiving a first measured distance between the inboard portion and the surface, and a second measured distance between the outboard portion and the surface, the first measured distance and the second measured distance comprising a height data set;
determining whether the displacement indicates a relatively low degree of displacement of the outboard portion relative to the inboard portion or a relatively high degree of displacement of the outboard portion relative to the inboard portion;
upon determining that the displacement indicates a relatively low degree of displacement, generating from the height data set a first control signal comprising a respective inboard height signal and a respective outboard height signal in which the magnitude of the inboard height signal is increased relative to the magnitude of the outboard height signal; and
upon determining that the displacement indicates a relatively high degree of displacement, generating from the height data set a second control signal comprising a respective inboard height signal and a respective outboard height signal in which the magnitude of the outboard height signal is increased relative to the magnitude of the inboard height signal.

19. The method of claim 18, further comprising:
determining a proximity of the displacement to a predetermined maximum operation displacement value, and
in the step of generating the second control signal, a magnitude of the outboard height signal increases as a function of the proximity.

20. The method of claim 19, wherein the magnitude of the outboard height signal increases as an exponential function of the proximity.

* * * * *